G. A. MEAD.
RAIL BOND.
APPLICATION FILED OCT. 2, 1916.

1,297,383.

Patented Mar. 18, 1919.

Witness:

Inventor,
George A. Mead.

UNITED STATES PATENT OFFICE.

GEORGE A. MEAD, OF MANSFIELD, OHIO, ASSIGNOR TO THE OHIO BRASS COMPANY, OF MANSFIELD, OHIO, A CORPORATION OF NEW JERSEY.

RAIL-BOND.

1,297,383. Specification of Letters Patent. Patented Mar. 18, 1919.

Original application filed June 2, 1916, Serial No. 101,419. Divided and this application filed October 2, 1916. Serial No. 123,245.

*To all whom it may concern:*

Be it known that I, GEORGE A. MEAD, a citizen of the United States, residing at Mansfield, in the county of Richland, and State of Ohio, have invented certain new and useful Improvements in Rail-Bonds, of which the following is a specification.

This invention relates to rail bonds and is a division of my application for rail bonds and the method of manufacturing, filed June 2, 1916, Serial No. 101,419.

One object of the invention is to provide a bond which can be welded to a rail, thereby forming an integral union with the rail and giving a high degree of efficiency, both electrically and mechanically.

Another object of the invention is to produce a bond which can be so welded to the rail as to make use of the oxy-acetylene or a flame of similar nature, or of the electric arc, as the source of heat.

Another object of the invention is to produce a rail bond in which the strength of the union between the welding metal and the bond terminal will be greater for a given area of contact than the strength between the welding metal and copper, which is the usual metal from which rail bond terminals are constructed.

The invention consists in the novel construction, combination and arrangement of parts.

Figure 1:
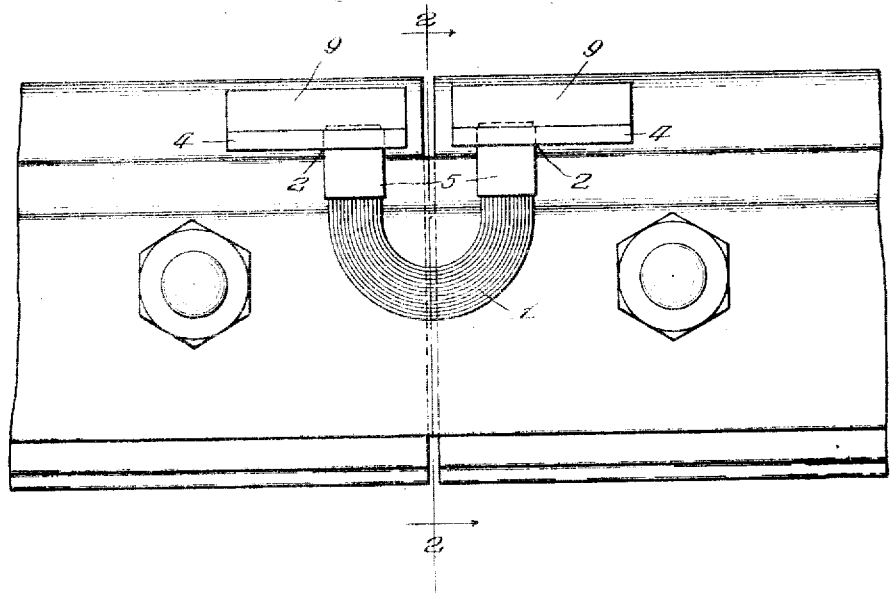
Figure 3:
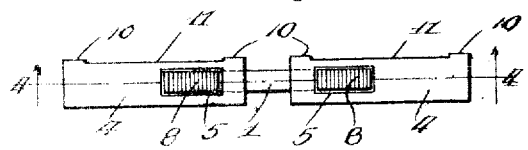
Figure 2:
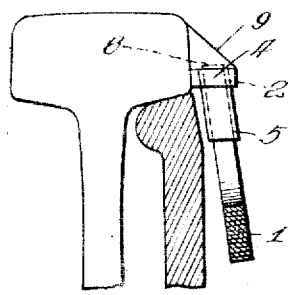
Figure 4:
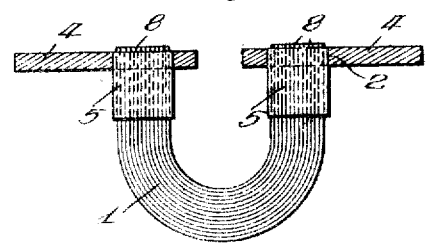

In the accompanying drawing. Figure 1 is a side elevation showing a bond constructed in accordance with the principles of the invention applied to the adjacent ends of two rails; Fig. 2 is a section taken on line 2—2 of Fig. 1; Fig. 3 is a top plan view of the bond before applied to the rail, and Fig. 4 is a section of the bond taken on line 4—4 of Fig. 3.

In bonding or electrically connecting the adjacent ends of rails it is desirable to make the connection as permanent and efficient electrically as possible. One of the objections found to most of the bonds now used is that they are held to the rail by bolts, rivets, expanding pins, etc., and in time become loose and lose their efficiency as a current conductor between rails, which would not be the case if they were welded to the rail, thereby forming an integral union and a connection of high and permanent efficiency.

In bonds to be welded to rails it has also been customary to construct the entire bond of copper on account of its high electrical conductivity, but in bonds so constructed and welded the mechanical union between the copper terminal of the bond and the welding metal is not all that can be desired.

A source of heat quite generally used in welding bonds to rails is the oxy-acetylene flame which gives a very intense concentrated heat of about 6,000 degrees F. The electric arc produces about the same results. The effect is to rapidly heat the rail surface and bond terminal surface to the melting point, at which time metal is applied in the form of a small rod or wire, to the place of application of heat which will at once melt the rod and the molten metal will unite and alloy with the molten metal on the surface of the bond terminal and the rail forming an integral union.

The molten metal can be caused to flow in almost any direction by properly directing the force of the flame, as the flame produces a driving effect. This is illustrated in Fig. 2 where the welding metal is indicated by numeral 9 and is shown as forming a sloping face which is produced by properly directing the flame against the welded metal while in a molten condition.

Bonds having copper terminals and applied as just described do not have as strong a mechanical union between the welding metal and the terminal as they do where the bond terminal is made of some other metal, such for instance as a ferrous metal, such as steel or iron, an alloy in which iron predominates, or a nickel alloy such as Monel metal.

With these points in view the bond of this invention is devised which can be welded to the rail by economical means thereby forming an integral connection and the construction is such that the best mechanical connection is made between the various parts.

A bond body 1 of flat copper ribbon or stranded copper cable is first formed up, or in some cases the body may be made of iron or steel, or nickel alloy. Using a laminated or stranded body gives greater flexibility over that of a solid body and requires that the ends be tightly held. The terminals 2 are made of iron, steel, an alloy in which iron predominates, or a nickel alloy and are produced either by drop forging or casting, consisting in the preferred form, of two parts; a shelf 4 and a sleeve 5. The shelf is a flat surface on which to build up the welded metal 9; the sleeve 5 which is detachably connected to the shelf 4 is recessed throughout its length and the passage is slightly larger than the cross section of the bond body 1, one end of which is inserted into the sleeve as clearly shown in Fig. 4.

In using a copper body 1 and a ferrous or nickel alloy terminal, the union between the copper body and the welded metal is not as strong mechanically as the union between the shelf 4 and the welding metal 9. Therefore it is desirable to tightly compress the sleeve on to the body making a strong mechanical union between the body and the terminal preventing the joints between the body and the welding metal 9 tearing loose.

To facilitate the application of the welding flame into the corner formed by the rail and bond terminal, the terminal is spaced a slight distance from the rail by placing feet or projections 10 on one side of the terminals forming the reduced portion 11 between them. This is the side applied to the rail and as the reduced portion 11 forms a slot between the terminal and the rail it prevents a reflection of the flame from the extreme corner by allowing its escape through the slot formed thereby.

The relative location of the shelf 4 and the sleeve 5 may be changed to suit requirements, also the shape of the parts and even the method of attaching the body 1 to the terminal. The shelf may be at one end of the sleeve or it may be intermediate the ends, and it is found advantageous to allow the end of the body 1, as designated by the numeral 8, to extend beyond the face or end of the opening through the sleeve 5, for by doing this the welding metal 9 and the end of the body 1 are properly united, although it is not absolutely necessary that the end of the bond protrudes.

The best location for the bond is on the side of the body of the rail, as shown by Figs. 1 and 2, but by modifying the shape it can be applied to other locations on the rail, as for example, on the web or base. When applied to the ball of the rail the welding metal is applied to produce a bevel or sloping face with the outer surface of the welding metal sloping upward and toward the rail surface, thereby presenting less chance for the bond to be torn off by wagon wheels or horses' hoofs at street crossings, or by double-flanged wheels, or other causes at points along the track.

In this construction it should be understood that the sleeve 5 is compressed or otherwise attached to the body and the shelf 5 slipped over the end of the sleeve and held firmly in place by the welding metal. In some cases it may be found that the shelf 4 is not necessary, and the bond may be attached directly to the rail through the sleeve and the welding metal. Copper, phosphor copper or some of the bronzes give the best results as a welding metal and have high electrical conductivity.

It is apparent to one skilled in the art that the bond as described above and its application, possesses the advantages of a copper body connecting the two rails, and it is welded to the rail by metal of equal conductivity, or practically the same conductivity when copper or bronze welding metal is used, and hence the electrical resistance from rail to rail is low; as the bond terminal is of iron, steel, or similar material, the mechanical union between the welding metal and the terminal is very strong; the union between the welding metal and the rail surface is similar to that of the terminal; and since the body of the bond is attached securely to the terminal as well as to the welding metal, the bond as a whole possesses high efficiency both electrically and mechanically when applied to the rail as described.

I claim:—

1. A rail bond adapted to be welded to a rail consisting of a body and terminals of dissimilar metals, the terminals comprising a sleeve and a shelf member detachably connected to the sleeve and extending in a plane transverse thereto, the sleeve being compressed onto the body and the extreme end of the body being exposed.

2. A rail bond for attachment to a rail by welding consisting of a body and terminals of dissimilar metals, the terminals comprising a sleeve and a shelf member detachably connected together and extending at right angles to each other and the sleeve being tightly compressed on the body.

3. A rail bond to be welded to a rail consisting of a body and terminals, the terminals made of iron and comprising a sleeve and a transversely extending shelf member detachably connected together and the sleeve attached to the body.

4. A rail bond for welding attachment to a rail consisting of a body and terminals of dissimilar metals and united together, the terminals comprising a sleeve and shelf member detachably connected, the shelf extending in a plane other than parallel to the axis of the sleeve.

5. A rail bond adapted to be attached to a rail by welding consisting of a body having its ends encircled by sleeves and the sleeves provided with detachable shelves which extend in a plane other than parallel to the sleeves and body.

6. A rail bond adapted to be attached to a rail by welding metal and consisting of a body having its ends encircled by sleeves which are tightly compressed onto the body and provided with transversely extending detachable shelves.

7. A rail bond for attachment by welding metal to a rail, consisting of a body having the ends encircled by sleeves of a dissimilar metal, the sleeves provided with detachable shelves which extend in a plane transverse to the axis of the sleeves.

8. A rail bond adapted to be attached by welding metal to a rail, consisting of a body having the ends encircled by sleeves of a ferrous metal and provided with a detachably connected shelf member extending transversely thereof.

9. A rail bond consisting of a body and terminals of dissimilar metals, the terminals comprising a sleeve and a shelf member detachably connected to the sleeve and extending in a plane other than parallel to the sleeve, the terminals being attached to the body by compression and the extreme end of the body extending beyond the sleeve.

10. A rail bond consisting of a body and terminals, the terminals made of iron and comprising a sleeve and a transversely extending shelf member detachably connected together and the terminals attached to the body, the end of the body extending beyond the terminal.

11. A rail bond consisting of a body having the ends encircled by sleeves of a ferrous metal with the ends extending beyond the sleeves, and a detachably connected shelf member which extends in a plane other than parallel to the axis of the sleeve or of the body.

In testimony whereof I have signed my name to this specification, on this 21st day of September, A. D. 1916.

GEORGE A. MEAD.